(No Model.)

H. D. KLOTS.
MOUNTING FOR SPINNING SPINDLES.

No. 534,477. Patented Feb. 19, 1895.

WITNESSES:

Henry D. Klots
INVENTOR

ATTORNEY.

UNITED STATES PATENT OFFICE.

HENRY D. KLOTS, OF NEW YORK, N. Y.

MOUNTING FOR SPINNING-SPINDLES.

SPECIFICATION forming part of Letters Patent No. 534,477, dated February 19, 1895.

Application filed August 25, 1894. Serial No. 521,277. (No model.)

*To all whom it may concern:*

Be it known that I, HENRY D. KLOTS, a citizen of the United States, residing in the city, county, and State of New York, have invented certain new and useful Improvements in Mountings for Spinning-Spindles, of which the following is a specification.

This invention relates particularly to spindles for spinning silk, &c., which are frictionally driven by a rapidly running belt or other driver. I have recently made and patented improvements in the mounting of such spindles, whereby I am enabled to drive them practically at a much higher rate of speed than heretofore, and at so high a speed that it is impracticable to stop them quickly and temporarily, as for repairing a thread, by the old method of simply grasping the spindle with the hand while being driven.

The main object of my invention is therefore to provide simple and practical means of withdrawing the spindle whirl from the belt or other driver, preparatory to stopping the spindle by hand.

In accordance with my invention I secure the spindle bearing in any desired position on a carrier which is mounted adjustably on the spindle rail, so that the carrier can be adjusted to withdraw the spindle from the driver and I provide a suitable mechanical device, for example, a cam actuated by a treadle for the foot of the attendant, whereby the attendant can instantly and at any time stop the spindle for such purpose as may be necessary.

In order that my invention may be clearly ascertained I shall first describe in detail the mode in which I carry the invention into effect, and then point out the invention in the claims.

Reference is to be had to the accompanying drawings, forming part of this specification, in which the same parts are designated by like letters of reference in all the figures.

Figure 1:
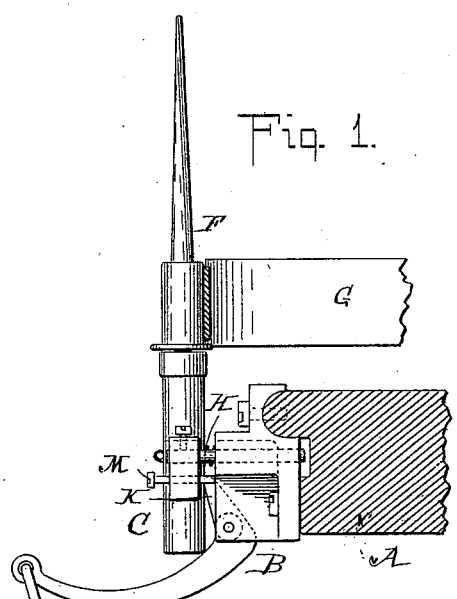
Figure 2:
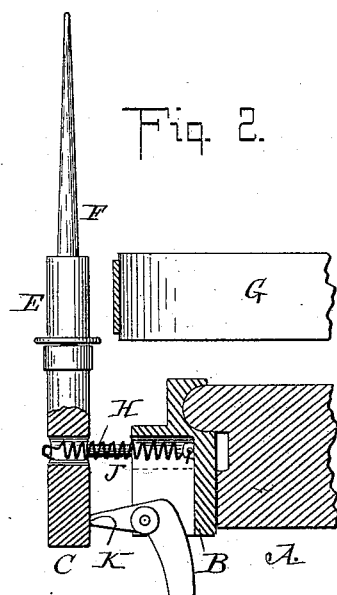
Figure 3:
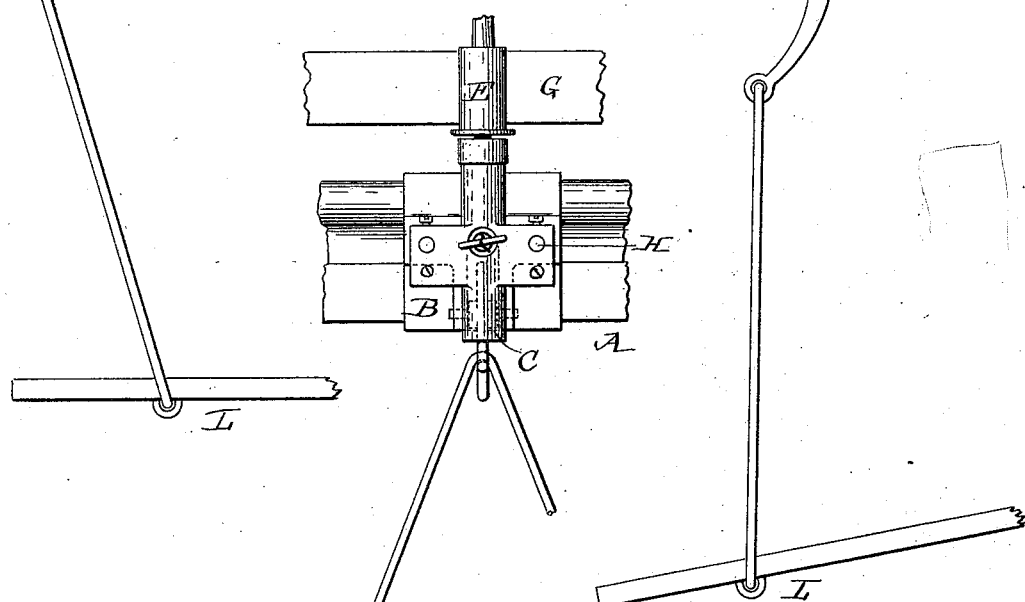

Figure 1 is an elevation, partly a section, of a mounting for spinning spindles practically embodying my invention, showing the spindle in operative position. Fig. 2 is a sectional elevation of the same, showing the spindle withdrawn. Fig. 3 is a front elevation of the same.

A designates a spindle rail, to which I, by preference, secure, as by means of screws, a base-piece B, which thus practically constitutes a detachable portion of the rail A, and on which I mount the carrier C, of the spindle-bearing adjustably, so that said carrier C, and hence the whirl E of the spindle F, can be moved to and from the belt or driver G. For such adjustable connection of the carrier C to the spindle rail, I prefer to employ horizontal rods H fixed to the carrier C and sliding longitudinally in corresponding guides in the base-piece B, to and from the driver G, as shown.

For adjusting the carrier C and spindle F to and from the driver, I by preference use, as shown, springs J to draw and hold the carrier and spindle normally toward the driver G, and thus in operative position, and a cam lever K pivoted to the base piece and working against the carrier C, for withdrawing the spindle from such operative position preparatory to stopping it by hand.

The cam lever K may be constructed as shown to lock the carrier and spindle automatically in such inoperative position when thrown fully over, and may thus be operated entirely by hand, as, when locked, both hands of the attendant would be free for mending the thread; or a treadle L and connecting rod may be added, as shown, for operation by the foot of the attendant, in which instance a locking arrangement would not be necessary, although one is here shown.

I further prefer to employ set screws M working between the carrier and the base-piece for limiting the return of the carrier.

Instead of the cam and locking arrangement shown, any other suitable means for withdrawing the adjustable spindle carrier may be employed, and such carrier may swing adjustably instead of slide, as shown. It is also evident that there are numberless other ways of securing the spindle in position when withdrawn, without departing from the scope of my invention.

Having thus described my invention, what I claim, and desire to secure by Letters Patent, is—

1. The combination, with the spindle rail and driver, of a spindle-carrier movable toward and from the driver, a device for withdrawing the spindle carrier from the driver, a spring pressing the spindle-carrier toward the driver, and adjustable stops M to limit the return of the spindle-carrier and adjust the pressure of the spindle on the driver, substantially as shown and described.

2. The combination, with the spindle-rail and driver and the spindle-carrier movable toward and from the rail, of a pivotal cam to withdraw the carrier from the rail, acting between the rail and carrier, substantially as described.

3. The combination, with the spindle rail and driver and the spindle carrier mounted to slide toward and from the rail, of a pivotal cam to withdraw the sliding carrier from the rail, acting between the said carrier and the rail, substantially as described.

4. The combination, with the spindle rail and driver and the spindle carrier mounted to slide toward and from the rail, of a spring pressing the sliding carrier toward the rail, and adjustable stops acting between the rail and the carrier, substantially as described.

5. The combination, with the spindle rail and driver, of a spindle carrier movable toward and from the driver, a device for withdrawing the spindle carrier from the driver, a spring holding the spindle-carrier against the driver, and a stop M limiting the return of the carrier and fixing the normal position of the spindle with respect to the driver, substantially as described.

6. The combination, with the spindle rail and driver, of a spindle carrier, rods sliding in guides by which the spindle-carrier is movably attached to the rail on both sides of the spindle, and a device for moving the spindle carrier on said sliding rods and guides toward and from the driver, substantially as described.

In testimony whereof I, the said HENRY D. KLOTS, have hereunto subscribed my name, in the city, county, and State of New York, this 16th day of August, 1894.

HENRY D. KLOTS.

In presence of—
CLARENCE L. BURGER,
J. B. PAIGE.